United States Patent
Venkatachalam et al.

(10) Patent No.: US 8,588,201 B2
(45) Date of Patent: Nov. 19, 2013

(54) METHOD AND APPARATUS FOR IMPROVING RF COVERAGE AREA IN A WIRELESS NETWORK

(75) Inventors: Muthaiah Venkatachalam, Beaverton, OR (US); Masud Kibria, Portland, OR (US); Shailender Timiri, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1884 days.

(21) Appl. No.: 11/273,781

(22) Filed: Nov. 15, 2005

(65) Prior Publication Data

US 2007/0121567 A1 May 31, 2007

(51) Int. Cl.
 *H04J 1/00* (2006.01)
(52) U.S. Cl.
 USPC ........... 370/343; 370/315; 370/332; 370/252; 370/203; 370/204; 370/208; 370/229; 370/232; 370/230; 370/231; 370/233; 370/234; 370/235; 370/344; 370/431; 370/436; 370/437; 370/433; 370/443; 370/465; 370/468; 370/473; 370/477
(58) Field of Classification Search
 USPC ......... 370/203, 204, 208, 229–235, 343, 344, 370/431, 436, 437, 433, 443, 465, 468, 473, 370/477, 315, 332, 252; 375/260
 See application file for complete search history.

(56) References Cited

U.S. PATENT DOCUMENTS 7,027,407 B2 * 4/2006 Diepstraten et al. .......... 370/252
2002/0061742 A1 * 5/2002 Lapaille et al. ............... 455/414
2006/0002346 A1 * 1/2006 Sutivong et al. .............. 370/332
2006/0019677 A1 * 1/2006 Teague et al. .............. 455/456.3
2006/0020474 A1 * 1/2006 Stewart et al. ................ 704/500
2006/0183495 A1 * 8/2006 Soliman ...................... 455/522
2006/0245384 A1 * 11/2006 Talukdar et al. .............. 370/310
2007/0060178 A1 * 3/2007 Gorokhov et al. ........... 455/506
2008/0170533 A1 * 7/2008 Cyzs et al. ................... 370/315

FOREIGN PATENT DOCUMENTS

WO WO-2006107835 A1 10/2006
WO 2007/059196 A1 5/2007

OTHER PUBLICATIONS

"IEEE 802.16 Medium Access Control and Service Provisioning", *Intel Technology Journal*, vol. 8, Issue 3,(Aug. 20, 2004),18 pages.
Sanders, T. , "The Many Flavors of OFDMA", *ISP-Planet-Fixed Wireless, Technology*, (Oct. 10, 2005).
Seungwan, R. , et al., "Urgency and Efficiency based Wireless Downlink Packet Scheduling Algorithm in OFDMA System", *Vehicular Technology Conference-2005*, (May 30, 2005),1456-1462.
Xhafa, A. E., et al., "MAC Performance of IEEE 802.16e", *Vehicular Technology Conference—2005*, (Sep. 28, 2005),685-689.

(Continued)

*Primary Examiner* — Olumide T Ajibade Akonai
*Assistant Examiner* — Shantell L Heiber
(74) *Attorney, Agent, or Firm* — Thorpe North & Western, LLP (57) ABSTRACT

Sub-channelization gain in an OFDMA-based wireless channel is enhanced by utilizing packet fragmentation when implementing a constant bit rate (CBR) real time (RT) packet application. A packet that would normally be transmitted using multiple sub-channels in a single OFDMA frame may be fragmented and delivered through the wireless channel over multiple frames. Because fewer sub-channels are used within each frame, sub-channelization gain is enhanced.

21 Claims, 6 Drawing Sheets

(56) References Cited

OTHER PUBLICATIONS

International Search Report and the Written Opinion received for PCT Patent Application No. PCT/US2006/044311, mailed on Apr. 2, 2007, 8 pages.

International Preliminary Report on Patentability and the Written Opinion received for PCT Patent Application No. PCT/US2006/044311, mailed on May 29, 2008, 9 pages.

* cited by examiner

METHOD AND APPARATUS FOR IMPROVING RF COVERAGE AREA IN A WIRELESS NETWORK

TECHNICAL FIELD

The invention relates generally to wireless communications and, more particularly, to wireless networking.

BACKGROUND OF THE INVENTION

In wireless wide area networks (WWANs), such as networks following IEEE 802.16, and other wireless networks, the user device (e.g., the subscriber station) is typically the limiting factor when determining the RF coverage area of a base station or access point. This is because of the transmit power limitations often associated with user devices. Techniques are needed for improving the RF coverage area of base stations or access points in such networks.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
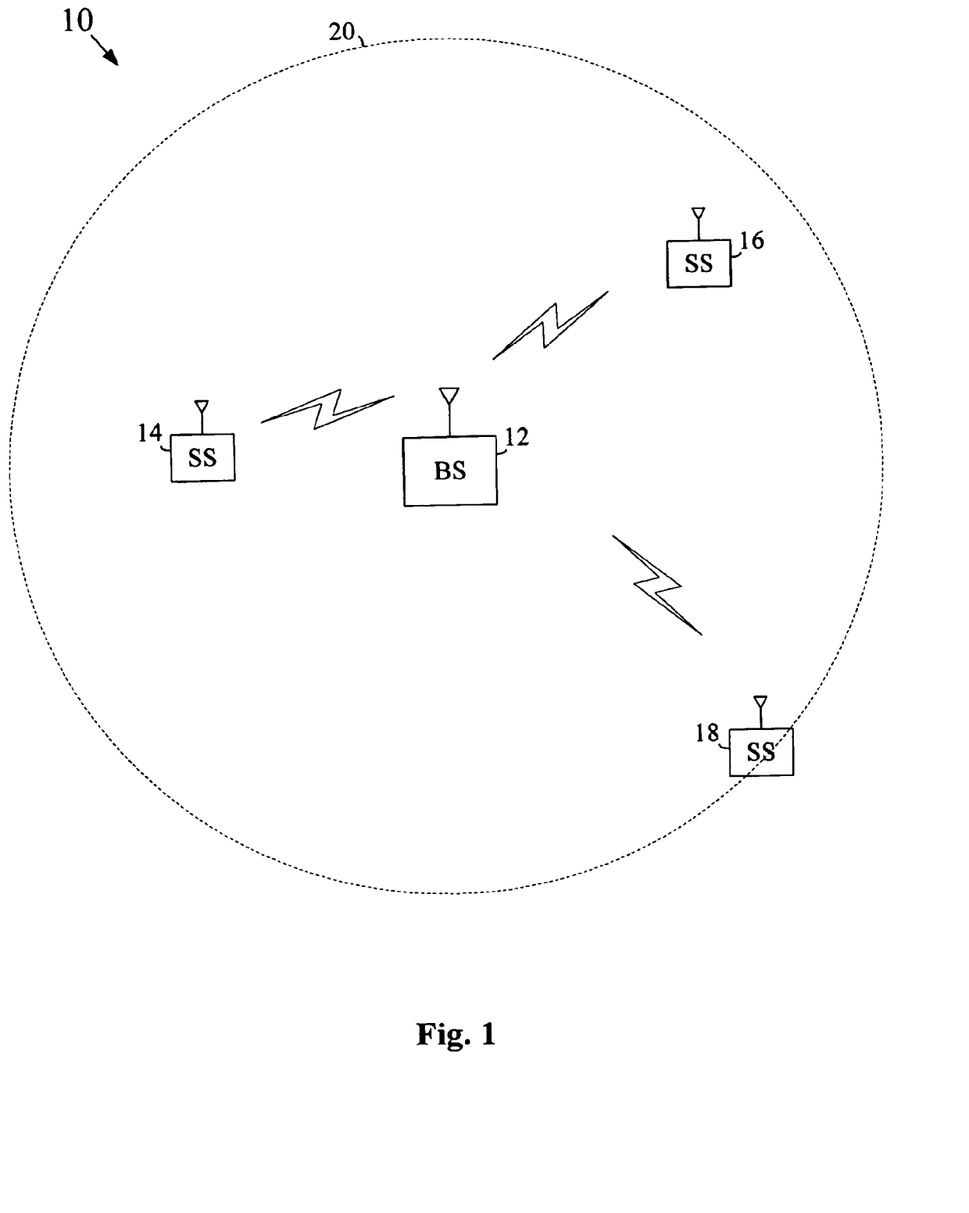
FIG. 1 is diagram illustrating a wireless network arrangement that may utilize features of the present invention.

FIG. 1 is diagram illustrating a wireless network arrangement 10 that may implement features of the present invention. As shown, the wireless network arrangement 10 includes a wireless base station (or access point) 12 that is providing wireless network access services for a number of subscriber stations 14, 16, 18. The base station 12 may maintain a wired link to one or more wired networks (e.g., the Internet, the public switched telephone network (PSTN), and/or others). As shown, some subscriber stations (e.g., SS 14) may be closer to the base station 12 and others (e.g., SS 18) may be farther away. The base station 12 will typically be operable within a coverage region or cell 20 beyond which communication between the base station and a subscriber station becomes unreliable. As will be appreciated, it is desirable to develop techniques for increasing the size of the coverage region 20 within which reliable communication can take place between a base station and a subscriber station. The present invention relates to methods and structures that are capable of extending the coverage region in wireless networking systems.

In at least one embodiment, the base station 12 and the subscriber stations 14, 16, 18 utilize orthogonal frequency division multiple access (OFDMA) techniques to provide multiple access within the cell. Orthogonal frequency division multiplexing (OFDM) is a multicarrier transmission technique that uses a plurality of relatively narrowband sub-carriers to transmit data through a wireless channel. Each of the sub-carriers is substantially orthogonal to the other sub-carriers. Each sub-carrier may be modulated with a data symbol before transmission (although one or more sub-carriers may be left empty during a transmit operation). The various sub-carriers are then combined into a composite signal known as an OFDM symbol, which is transmitted into the wireless channel. This process is typically performed repeatedly to form a string of transmitted OFDM symbols. OFDMA is a form of OFDM that allows individual sub-carriers, or groups of sub-carriers, to be assigned to different users in the network. That is, one or more of the sub-carriers may be assigned to a first user, one or more other sub-carriers may be assigned to a second user, and so on. Each group of sub-carriers is known as a sub-channel because it is a subset of the full OFDM channel.

Figure 2:
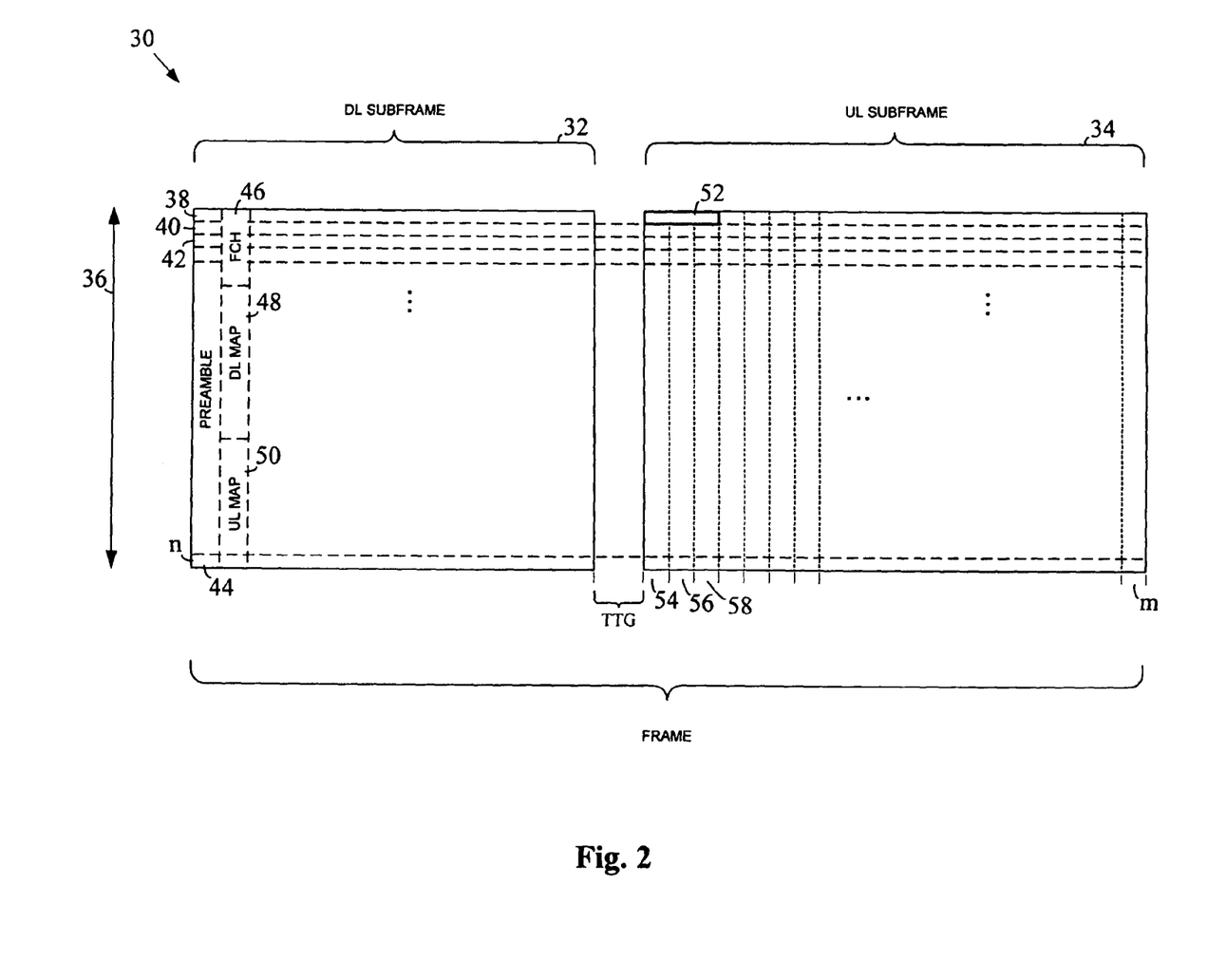
FIG. 2 is a diagram illustrating a time division duplex (TDD) OFDMA frame structure that may be used to organize communication in a cell of a wireless network in accordance with an embodiment of the present invention.

FIG. 2 is a diagram illustrating a time division duplex (TDD) OFDMA frame structure 30 that may be used to organize communication in a cell of a wireless network in accordance with an embodiment of the present invention. As shown, the frame 30 is divided into a downlink (DL) sub-frame 32 and an uplink (UL) sub-frame 34. During the DL sub-frame 32, the base station in the cell transmits data to one or more subscriber stations in the cell. During the UL sub-frame 34, subscriber stations in the cell transmit data to the base station. Within the frame 30, data is transmitted using a number of relatively narrowband, orthogonal sub-carriers distributed across a channel bandwidth 36. The sub-carriers are divided into a number of sub-channels 38, 40, 42, . . . , n within the channel bandwidth 36. Each sub-channel 38, 40, 42, . . . , n may include one or more sub-carriers. In at least one embodiment, there are 35 sub-channels within the channel bandwidth 36, each having 24 sub-carriers. Other frame configurations may alternatively be used.

A preamble 44 at the beginning of the DL sub-frame 32 includes a well known repetitive pattern that allows subscriber stations to synchronize to the corresponding frame 30. A frame control header (FCH) 46 within the DL sub-frame 32 includes the modulation-coding level for the MAP portion of the frame. A DL-map 48 within the DL sub-frame 32 includes information that maps the entire DL sub-frame 32. The DL-map 48 may include, for example, information describing when, and in what sub-channel(s), the base station will transmit to each subscriber station. A UL-map 50 within the DL sub-frame 32 includes information that maps the entire UL sub-frame 34. The UL map 50 may include information describing when, and in what sub-channel(s), each individual subscriber station may transmit data to the base station. After synchronizing to the preamble 44, a subscriber stations may read the DL-map 48 and the UL-map 50. The subscriber station will then know when, and in what sub-channels, it is to receive data from the base station and when, and in what sub-channels, it can transmit data to the base station during the frame 30. The base station will typically include a scheduler to develop the frame structure 30, and the corresponding DL map 48 and UL map 50, based on a number of different factors.

The techniques of the present invention are primarily concerned with transmission during the UL sub-frame 34 of the OFDMA frame 30. As discussed above, the UL sub-frame 34 includes a number of sub-channels 38, 40, 42, . . . , n within which to transmit data. The UL sub-frame 34 will also include a number of symbol periods 54, 56, 58, . . . , m within which data symbols may be transmitted in each sub-channel. In at least one embodiment, symbol periods of approximately 100.8 microseconds (μs) are used. Other values may alternatively be used. The number of symbol periods per sub-frame is a function of the sub-frame duration. Resource allocation in the network may be specified in terms of both frequency and time. The smallest unit of resource allocation in a frame is called a "slot." In at least one embodiment, as illustrated in FIG. 2, an uplink slot 52 is defined as three symbol times by one sub-channel. Other slot sizes may alternatively be used. A scheduler may allot one or more UL slots to each subscriber station in a cell that requires bandwidth. The subscriber station will then be able to transmit data to the corresponding base station within the allotted UL slot(s).

Figure 3:
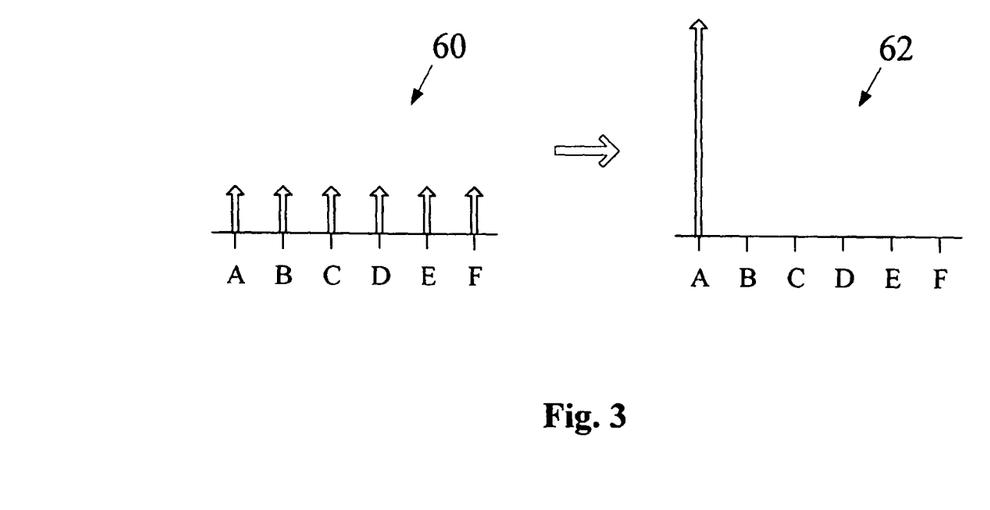
FIG. 3 is a diagram illustrating the use of uplink sub-channelization in a wireless network to improve range between a subscriber station and a base station.

In a cell of a wireless network, the operational range between a base station and a subscriber station is usually limited by the transmit power limitations of the subscriber station. In an OFDM-based system, one way to compensate for this power level disparity is to utilize a technique known as uplink sub-channelization. FIG. 3 is a diagram illustrating this technique in an OFDMA system having 6 sub-channels within a channel bandwidth (i.e., sub-channels A, B, C, D, E, and F). As shown, in a first scenario 60, a subscriber station transmits data to a base station using an equal transmit power level in each of the available sub-channels A, B, C, D, E, and F. Due to constraints on the total power transmitted by the subscriber station, a relatively low transmit power level may be used within each sub-channel. When uplink sub-channelization is used, on the other hand, the transmit power may be concentrated within one (or less than all) of the sub-channels (see, e.g., scenario 62 of FIG. 3). In this manner, a higher transmit power level may be used within the chosen sub-channel(s) and a longer range may be achieved by the subscriber station of interest. The other sub-channels (e.g., sub-channels B, C, D, E, and F in FIG. 3) will not transmit data for the subscriber station of interest. The sub-channelization gain that is achievable using this technique may be calculated as follows:

$$GAIN = 10 \log N/k$$

where N is the number of sub-channels in the channel bandwidth and k is the number of sub-channels that the subscriber station is using to transmit. As will be appreciated, the maximum sub-channelization gain is achieved when transmissions are limited to one sub-channel (i.e., k=1). As an example, if the number of sub-channels within a channel bandwidth is 35, and a subscriber station transmits at full power within a single sub-channel, the sub-channelization gain will be equal to $10 \log 35 = 15.44$ dB. This gain will factor in directly in the link budget calculation for the connection.

One category of application that may be supported in a wireless network is constant bit rate (CBR) real time (RT) packet applications. One example of such an application is voice-over-IP (VoIP) in which a user's voice signal is digitized and transmitted through a network in a series of packets. Other examples of CBR-RT packet applications include, for example, video streaming applications, audio streaming applications, T1 link emulation, and/or others. The data within each packet generated by a CBR-RT packet application may need to be transmitted through a wireless channel in a wireless network. As stated above, the maximum sub-channelization gain is achieved when a packet transmission from an OFDMA subscriber station is limited to a single sub-channel. However, in CBR-RT packet applications, there is often more data within a packet of the application (e.g., a VoIP packet, etc.) than can be transmitted within a single sub-channel of an OFDMA frame. In such cases, the data within the subject packet has traditionally been transmitted within multiple sub-channels of the UL sub-frame, with a reduced sub-channelization gain resulting.

In conceiving the present invention, it was appreciated that CBR-RT packet applications being implemented in wireless networks typically generate packets at intervals that are larger than the size of the OFDMA frame being used in the corresponding wireless link. For example, in a VoIP application, VoIP packets may be generated every 20 milliseconds (msec) within a subscriber station, while the OFDMA frames that will carry the voice information from the subscriber station to the base station occur every 5 msec. In one aspect of the present invention, the data from a single packet of a CBR-RT packet application is fragmented across multiple OFDMA frames so that the total number of sub-channels that are being used within each frame can be reduced, thereby increasing the sub-channelization gain that is achieved. If the number of sub-channels ultimately used within each frame can be reduced to one, then an optimal level of sub-channelization gain may be achieved in the wireless link for the subscriber station. However, any reduction in the number of sub-channels per frame can result in an increase in sub-channelization gain.

Figure 4:
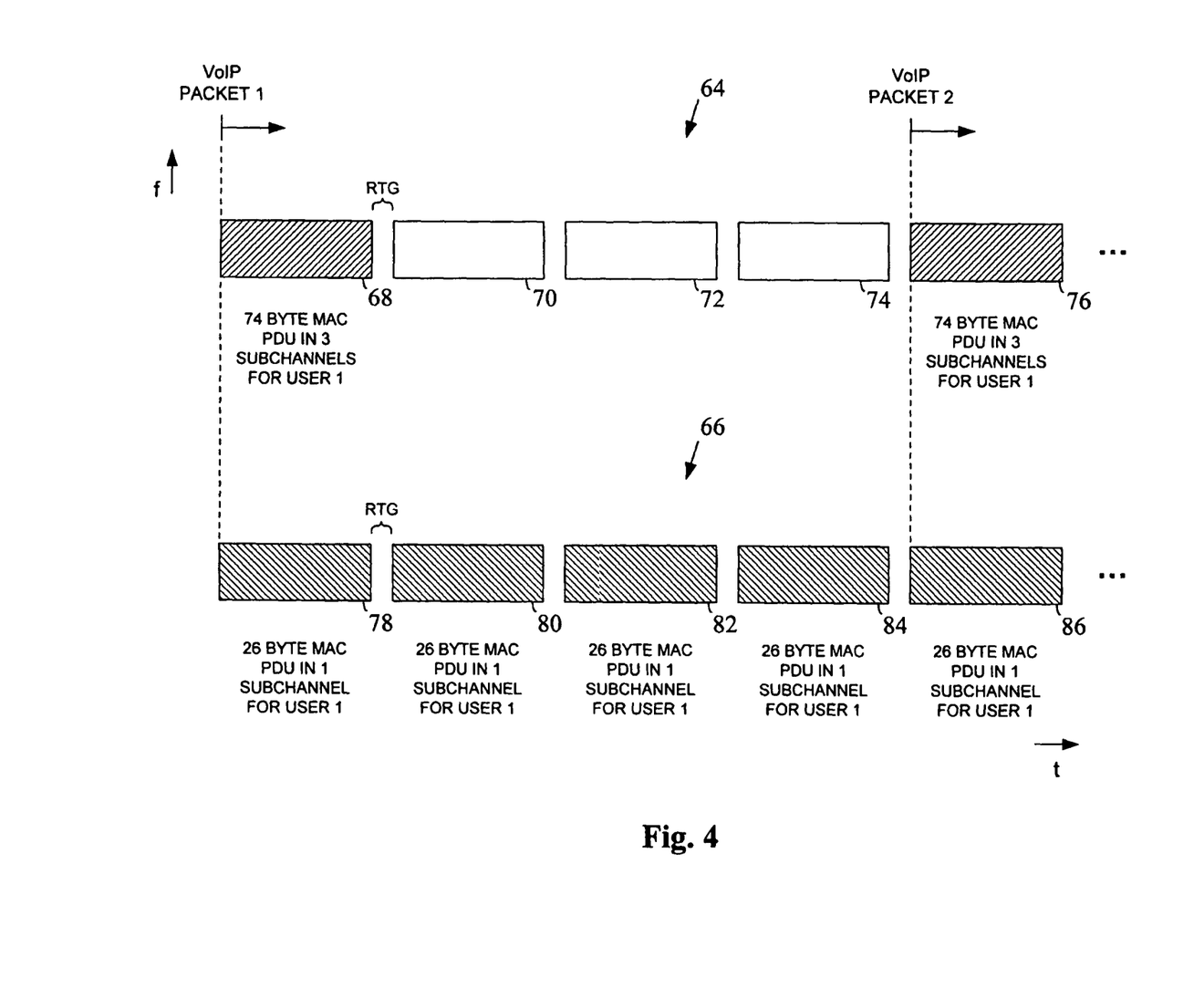
FIG. 4 is a diagram illustrating examples of the transmission of digital voice data through a wireless link from a subscriber station to a base station in accordance with an embodiment of the present invention.

FIG. 4 is a diagram illustrating examples of the transmission of digital voice data through a wireless link from a subscriber station to a base station in accordance with an embodiment of the present invention. An upper portion 64 of the diagram illustrates a previous technique for transmitting the voice data and a lower portion 66 illustrates an example of the inventive technique. In each of the portions, a series of consecutive OFDMA frames are being transmitted from the subscriber station to the base station. That is, in the upper portion 64, frames 68, 70, 72, 74, 76, . . . are being transmitted and in the lower portion frames 78, 80, 82, 84, 86, . . . are being transmitted. In at least one embodiment, the bandwidth of the OFDMA channel is 10 megaHertz (MHz) and the number of UL sub-channels in the bandwidth is 35. The duration of each frame is 5 msec and the number of usable UL symbol periods in each frame is 16. Each slot in the example is defined as 3 symbol periods per sub-channel. Thus, there are 5 slots per UL sub-channel in the illustrated example.

It will be assumed that the subscriber station is executing a VoIP application using a G.729 encoder. The application generates an uncompressed VoIP packet having 20 bytes (B) of voice payload every 20 msec. To the VoIP packet may be added, for example, a 4 B secure real time transport protocol (sRTP) header, a 12 B real time transport protocol (RTP) header, an 8 B user datagram protocol (UDP) header, and a 20 B Internet protocol (IP) header to form an IP packet having a length of 64 B. In addition to this, in the medium access control (MAC) layer, a 6 B generic MAC header and a 4 B cyclic redundancy check (CRC) may be added to the IP packet to achieve a MAC protocol data unit (PDU) having a total length of 74 B. In the example of FIG. 4, it is assumed that the wireless network uses quadrature phase shift keying (QPSK) ½ as the target cell edge modulation and coding scheme (MCS) to maximize coverage in the cell. It is also assumed that this is the MCS that is being used by the subscriber station (i.e., the channel between the subscriber station and the base station is of relatively low quality). Using this MCS, the number of bytes that may be transmitted per slot is 6. Because there are 5 slots per sub-channel, the total number of bytes that may be transmitted within a sub-channel at the cell edge is 5×6=30 B.

As discussed above, the number of bytes within each MAC PDU to be transmitted is 74. As only 30 B may be transmitted within each sub-channel, three sub-channels are required within an OFDMA frame to transmit the MAC PDU from the subscriber station to the base station. This is shown in the upper portion 64 of the diagram of FIG. 4. That is, the scheduler within the base station schedules three sub-channels within the UL sub-frame of OFDMA frame 68 within which to transmit the 74 B MAC PDU from the subscriber station to the base station. As shown, the next three frames 70, 72, 74 do not include any voice information being transmitted from the subject subscriber station to the base station (although they may include data being transmitted from other subscriber stations to the base station). Eventually, another VoIP packet is received (i.e., VoIP packet 2 in FIG. 4) and three sub-channels within the UL sub-frame of OFDMA frame 76 are again allotted to the subscriber station to transmit the corresponding MAC PDU to the base station. Because 3 sub-channels are used to transmit the MAC PDU to the base station, a sub-channelization gain of 10 log (35/3)=10.67 dB is achieved. As described previously, the maximum sub-channelization gain that can be achieved in a channel having 35 sub-channels is 15.44 dB. Therefore, using three sub-channels results in a reduction in the sub-channelization gain of 15.44-10.67=4.77 dB.

In accordance with one aspect of the invention, instead of transmitting all of the voice data from the subject subscriber station to the base station within a single OFDMA frame, the voice data is spread out among multiple frames in a manner that reduces the number of sub-channels required within each frame. For example, with reference to the lower portion 66 of FIG. 4, instead of transmitting the entire 64B IP packet within one OFDMA frame, the packet is fragmented over 4 OFDMA frames 78, 80, 82, 84 with 16 B in each frame. A MAC header of 6 B and a CRC of 4 B is added to each 16 B IP packet fragment to achieve a MAC PDU of 26 B. As described previously, 30 B may be transmitted within each sub-channel of the OFDMA frame at the cell edge, therefore the 26 B MAC PDU will fit within a single sub-channel within the remaining frames before the next VoIP packet is received. Thus, the maximum level of sub-channelization gain is achieved for the subscriber station within each OFDMA frame and a better range (i.e., a larger coverage region) results. This technique requires a larger amount of MAC header overhead because each packet fragment requires its own MAC header, but the increase in sub-channelization gain will, in many cases, be worth the additional overhead. In addition, the transmission of the VoIP packet over multiple OFDMA frames will result in increased time diversity capacity gains that may further justify the additional overhead.

In at least one embodiment of the present invention, many of the inventive techniques are implemented within the scheduler of a base station within a cell. That is, the scheduler will determine when fragmentation of a packet is to take place for a particular subscriber station and will use that information to develop the UL map information for a subsequent OFDMA frame. Upon receiving the OFDMA frame, the subscriber station may read the UL map to determine whether to fragment the next packet. In one implementation, the scheduler will attempt to determine the lowest number of available frames that will allow a packet to be transmitted within a single sub-channel per frame. By available frames, it is meant the frames that occur before the next packet is received from the corresponding application to be transmitted into the wireless channel (e.g., see frames 78, 80, 82, and 84 in FIG. 4). If there are not enough available frames to transmit the packet within a single sub-channel per frame, then multiple sub-channels may be allotted to the subscriber station per frame. In another implementation, the scheduler may always utilize all available frames for packet fragments. The scheduler may, for example, divide the VoIP packet into P equal fragments, where P is the number of available frames, and then add on the appropriate MAC overhead to determine how much data is to be included in each available frame. The corresponding number of sub-channels may then be allocated to the subject subscriber station for each frame. Other techniques for scheduling a packet using fragmentation may alternatively be used.

Figure 5:
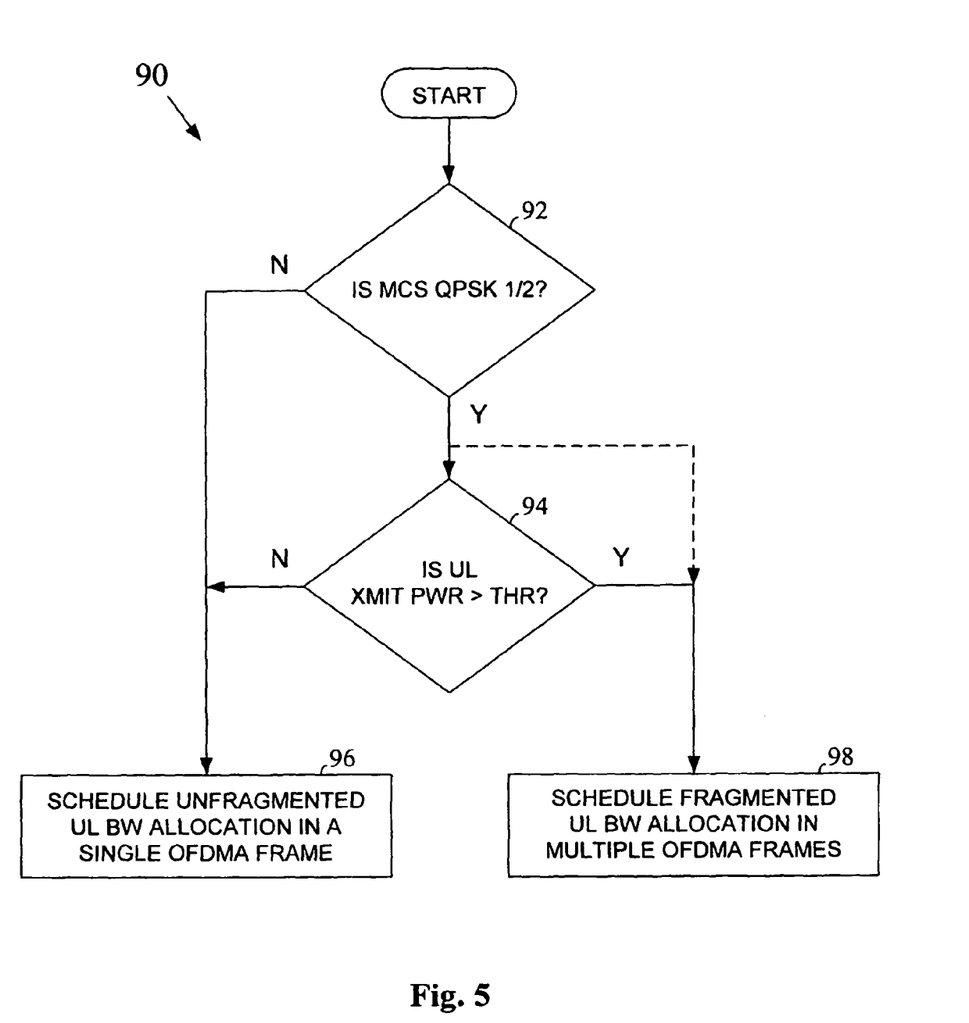
FIG. 5 is a flowchart illustrating an example method for determining whether to use fragmentation for a packet in accordance with an embodiment of the present invention.

In at least one embodiment of the present invention, the packet fragmentation technique is only used for relatively low quality channels. For example, in one approach, the technique is only used when a predetermined MCS is being utilized for a subscriber station (e.g., QPSK ½ or some other MCS being used on the cell edge, etc.). FIG. 5 is a flowchart illustrating an example method 90 for use in determining whether to use fragmentation in performing scheduling in a wireless network in accordance with an embodiment of the present invention. The method 90 may be implemented within, for example, the scheduler of a base station in a wireless network or in some other wireless network location. When uplink scheduling is to be performed for a first subscriber station, it is first determined whether the MCS being used for the subscriber station is QPSK ½ (or some other MCS being used at the cell edge) (block 92). This MCS will typically be assigned for a subscriber station when the channel between the subscriber station and the base station has a relatively low quality (e.g., when the base station is on the cell edge, when the link is non-line of sight, etc.). If QPSK ½ is not being used, then the scheduler will schedule an unfragmented bandwidth allocation for the subscriber station within a single uplink OFDMA frame, as was done in the past (block 96).

If QPSK ½ is being used, it may next be determined whether the maximum transmit power of the subject subscriber station is greater than a threshold level (block 94). The uplink transmit power of the subscriber station may be checked to determine whether the station is capable of generating the peak power necessary to perform uplink sub-channelization. If the maximum transmit power level of the subscriber station is not above the threshold level (block 94-N), then the scheduler will schedule an unfragmented bandwidth allocation for the subscriber station in a single uplink OFDMA frame (block 96). However, if the maximum transmit power level of the subscriber station is above the threshold level (block 94-Y), then the scheduler will schedule a fragmented bandwidth allocation for the subscriber station in multiple uplink OFDMA frames (block 98). Any technique may be used to fragment the bandwidth allocation as long as the result in an increase in sub-channelization gain and coverage area.

In one possible modification of the above-described method 90, it may be assumed that the subscriber station is capable of generating the requisite transmit power. Therefore, block 94 may be eliminated from the method and fragmentation is performed after it is determined that the predetermined MCS (e.g., QPSK ½) is being used by the subject subscriber station. In another possible modification, instead of testing for a single MCS in block 92, more than one may tested. In still another modification, conditions other than an MCS condition may be used to determine whether to perform fragmentation (e.g., some other metric to test the quality of the associated channel, such as SNR, SINR, CINR, mean instantaneous capacity (MIC), and/or others). Other modifications and variations may alternatively be made. The method 90 may be repeated for each subscriber station requesting an uplink bandwidth allocation.

Figure 6:
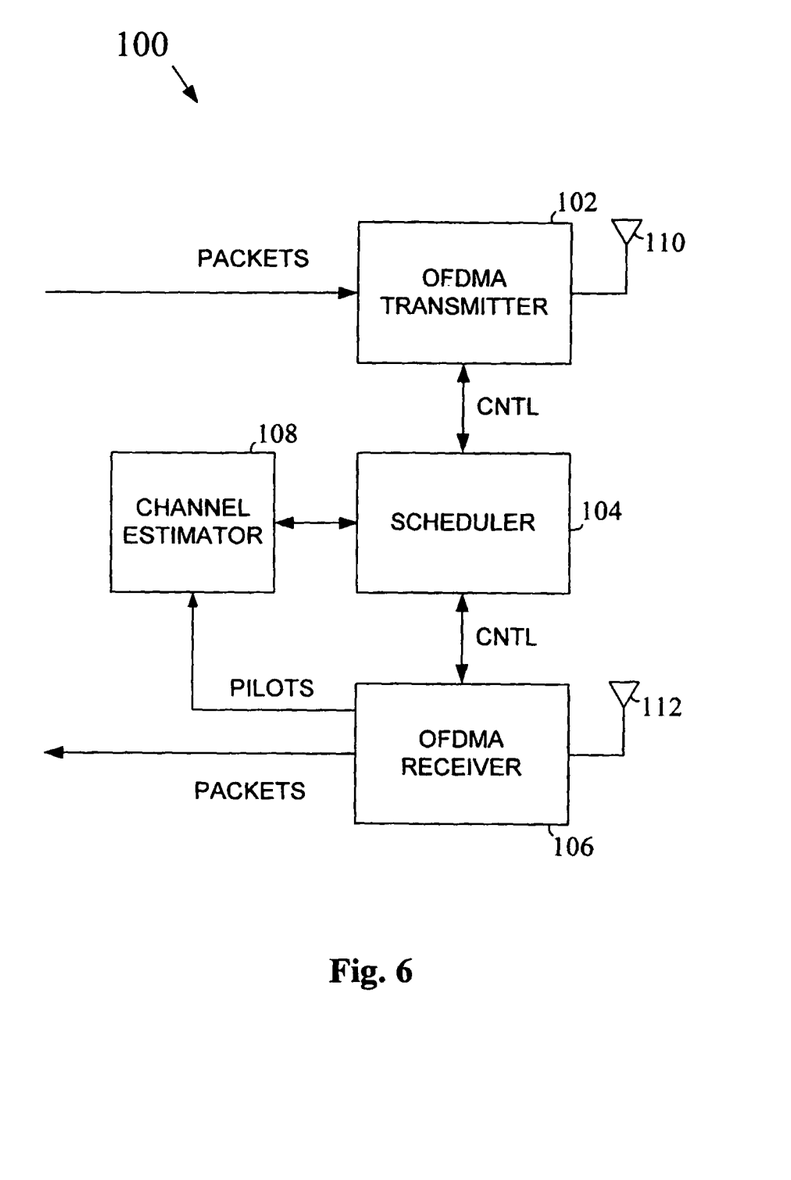
FIG. 6 is a block diagram illustrating an example wireless transceiver arrangement for use within a base station in a wireless network in accordance with an embodiment of the present invention.

FIG. 6 is a block diagram illustrating an example wireless transceiver arrangement 100 for use within a base station in a wireless network in accordance with an embodiment of the present invention. The transceiver arrangement 100 may be used, for example, within the wireless base station 12 of FIG. 1 or in other base stations and/or access points. As illustrated, the transceiver arrangement 100 may include: an OFDMA transmitter 102, a scheduler 104, an OFDMA receiver 106, and a channel estimator 108. The OFDMA transmitter 102 and the OFDMA receiver 106 may each be coupled to one or more corresponding antennas 110, 112 to facilitate the transmission of wireless signals into, and the reception of wireless signals from, the wireless channel. Any type of antennas may be used including, for example, dipoles, patches, helical antennas, antenna arrays, and/or others. Antenna sharing may also be used.

The scheduler 104 is operative for scheduling communication within a corresponding cell of the wireless network. The scheduler 104 may determine, for example, which portions of an OFDMA frame will be allocated to which subscriber stations in both the DL subframe and the UL subframe. The scheduler 104 may make these determinations based on a number of different factors. The OFDMA transmitter 102 may receive packets for a number of different subscriber stations in an associated cell and use the packets to generate a DL OFDMA sub-frame for transmission into the wireless channel. The OFDMA transmitter 102 may form the DL OFDMA sub-frame based on information received from the scheduler 104. The OFDMA transmitter 102 may receive DL map information and UL map information from the scheduler to be included within the DL OFDMA sub-frame to be transmitted.

The OFDMA receiver 106 may also receive the UL map information from the scheduler 104 so that the receiver 106 is able to anticipate when data is to be received from the various subscriber stations within the cell. The OFDMA receiver 106 outputs packets associated with the various subscriber stations (users) within the corresponding cell and sends them to routing functionality to be routed to a corresponding destination. The OFDMA receiver 106 may also output pilot tones to the channel estimator 108 for use in developing channel estimates for the wireless channel. These channel estimates may be delivered to the scheduler 104 for use in performing scheduling for the cell.

When a CBR-RT application (such as, e.g., VoIP, etc.) is being executed within a subscriber station in the cell, the scheduler 104 will need to determine the amount of UL resources to allocate to the subscriber station within each successive OFDMA frame. In at least one embodiment of the present invention, the scheduler 104 will use fragmentation of CBR-RT packets and delivery of the packet fragments over multiple OFDMA frames to improve the sub-channelization gain achieved by the subscriber station. This may be performed, for example, only when the subscriber station is near the cell edge or otherwise has a low quality connection with the base station. In at least one embodiment, the scheduler 104 is configured to implement the method 90 of FIG. 5. Other techniques for using fragmentation to improve range or connection quality between a subscriber station and a base station may alternatively be implemented within the scheduler 104.

In at least one embodiment of the invention, the inventive techniques are implemented almost fully within the network MAC layer. The IEEE 802.16 wireless networking standard, for example, includes a MAC SDU fragmentation mechanism that may be utilized to implement features of the invention. Other wireless standards may also include packet fragmentation functions that may be configured in accordance with the invention. In other embodiments, the invention may be implemented within a non-MAC layer or within multiple layers of a wireless protocol.

The techniques and structures of the present invention may be implemented in any of a variety of different forms. For example, features of the invention may be embodied within cellular telephones and other handheld wireless communicators; personal digital assistants having wireless capability; desktop, laptop, palmtop, and tablet computers having wireless capability; pagers; satellite communicators; cameras having wireless capability; audio/video devices having wireless capability; network interface cards (NICs) and other network interface structures; wireless access points and base stations; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVD), Blu-Ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. In at least one form, the invention is embodied as a set of instructions that are modulated onto a carrier wave for transmission over a transmission medium.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with its preferred embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
   first determining a period between successive orthogonal frequency division multiple access (OFDMA) frames in a wireless OFDMA channel;

second determining a period between successive packets in a constant bit rate input packet stream; and when there are multiple OFDMA frames for each packet in said constant bit rate input packet stream, fragmenting each packet for transmission through said wireless OFDMA channel by reducing a number of frequency sub-channels carrying information for a user, increasing a power of said frequency sub-channels, and increasing a number of frames in each packet to carry said information for said user to provide an increased time diversity capacity gain by using at least two of said multiple OFDMA frames to achieve a higher frequency sub-channelization gain than would be achieved by transmitting each packet within a single OFDMA frame.

2. The method of claim 1, wherein:

fragmenting is only performed when a predetermined modulation and coding scheme (MCS) is being used by a corresponding subscriber station, wherein said MCS changes with time based on changing channel conditions.

3. The method of claim 2, wherein:

said predetermined MCS is an MCS that is used when said corresponding subscriber station is at a cell edge.

4. The method of claim 1, wherein:

fragmenting a data packet includes fragmenting said data packet into portions that each fit within a single sub-channel of an OFDMA frame.

5. The method of claim 1, wherein:

the higher frequency sub-channelization gain is approximated by 10log N/m-10log N/s, wherein N represents the number of frequency sub-channels in a channel bandwidth, m represents the number of frequency sub-channels that a subscriber station uses to transmit the multiple OFDMA frames, and s represents the number of frequency sub-channels that a subscriber station uses to transmit the single OFDMA frame.

6. A method comprising:

determining that an uplink (UL) bandwidth allocation is needed for a wireless device to transmit a data packet to a wireless base station through an OFDMA channel;

when a modulation and coding scheme (MCS) assigned to said wireless device is not a first MCS, scheduling an unfragmented UL bandwidth allocation for said wireless device over a single OFDMA frame; and when said MCS assigned to said wireless device is said first MCS, scheduling a fragmented UL bandwidth allocation for said wireless device over multiple OFDMA frames to improve frequency sub-channelization gain, wherein said fragmented UL bandwidth allocation reduces a number of frequency sub-channels carrying information for said wireless device, increases a power of said frequency sub-channels, and increases a number of frames in each packet to carry said information for said wireless device to provide an increased time diversity capacity gain.

7. The method of claim 6, wherein:

said first MCS is an MCS that is assigned when said wireless device is at a cell edge.

8. The method of claim 6, wherein:

said fragmented UL bandwidth allocation is only scheduled when a maximum transmit power of said wireless device is above, a predetermined threshold level.

9. The method of claim 6, wherein:

said first MCS is quadrature phase shift keying (QPSK) ½.

10. An apparatus comprising:

a wireless orthogonal frequency division multiple access (OFDMA) transmitter to transmit data to one or more subscriber stations within downlink subframes of OFDMA frames;

a wireless OFDMA receiver to receive data from one or more subscriber stations within uplink subframes of said OFDMA frames; and a scheduler to schedule communications between said one or more subscriber stations and said apparatus, wherein said scheduler schedules bandwidth (BW) resources within multiple successive OFDMA frames for use by a first subscriber station to transmit a data packet to said apparatus when a channel quality of a channel between said first subscriber station and said apparatus meets a first criterion, to enhance frequency sub-channelization gain, wherein said bandwidth (BW) resources within multiple successive OFDMA frames reduces a number of frequency sub-channels carrying information for said wireless device, increases a power of said frequency sub-channels, and increases a number of frames in each packet to carry said information for said wireless device to provide an increased time diversity capacity gain, and said scheduler schedules BW resources within a single OFDMA frame for use by said first subscriber station to transmit said data packet to said apparatus when a channel quality of said channel between said first subscriber station and said apparatus meets a second criterion, said second criterion being different from said first criterion.

11. The apparatus of claim 10, wherein:

said channel quality meets said first criterion when a modulation and coding scheme (MCS) assigned to said first subscriber station is a first MCS.

12. The apparatus of claim 11, wherein:

said channel quality meets said second criterion when said MCS assigned to said first subscriber station is not said first MCS.

13. The apparatus of claim 11, wherein:

said scheduler only schedules BW resources within multiple successive OFDMA frames for use by said first subscriber station to transmit said data packet to said apparatus when said channel quality for said channel between said first subscriber station and said apparatus meets said first criterion and a maximum transmit power of said first subscriber station is above a predetermined threshold level.

14. The apparatus of claim 11, wherein:

said first MCS is QPSK ½.

15. A system comprising:

a dipole antenna;

a wireless orthogonal frequency division multiple access (OFDMA) transmitter, coupled to said dipole antenna, to transmit data to one or more subscriber stations within downlink subframes of OFDMA frames;

a wireless OFDMA receiver to receive data from one or more subscriber stations within uplink subframes of said OFDMA frames; and a scheduler to schedule communications between said one or more subscriber stations and said system, wherein said scheduler schedules bandwidth (BW) resources within multiple successive OFDMA frames for use by a first subscriber station to transmit a data packet to said system when a channel quality of a channel between said first subscriber station and said system meets a first criterion, to enhance frequency sub-channelization gain, wherein said bandwidth (BW) resources within multiple successive OFDMA frames reduces a number of frequency sub-channels carrying information for said wireless device, increases a power of said frequency sub-channels, and increases a number of frames in each packet to carry said information for said wireless device to provide an increased time diversity capacity gain, and said scheduler schedules BW resources within a single OFDMA frame for use by said first subscriber station to transmit said data packet to said system when a channel quality of said channel between said first subscriber station and said system meets a second criterion, said second criterion being different from said first criterion.

16. The system of claim 15, wherein:
said channel quality meets said first criterion when a modulation and coding scheme (MCS) assigned to said first subscriber station is a first MCS.

17. The system of claim 16, wherein:
said channel quality meets said second criterion when said MCS assigned to said first subscriber station is not said first MCS.

18. The system of claim 16, wherein:
said scheduler only schedules BW resources within multiple successive OFDMA frames for use by said first subscriber station to transmit said data packet to said system when said channel quality of said channel between said first subscriber station and said system meets said first criterion and a maximum transmit power of said first subscriber station is above a predetermined threshold level.

19. An article comprising a non-transitory computer readable storage medium having computer executable instructions stored thereon that, when executed by a computing platform, operate to:
determine that an uplink (UL) bandwidth allocation is needed for a wireless device to transmit a data packet to a wireless base station through an OFDMA channel;
when a modulation and coding scheme (MCS) assigned to said wireless device is not a first MCS, schedule an unfragmented UL bandwidth allocation for said wireless device over a single OFDMA frame; and
when said MCS assigned to said wireless device is said first MCS, schedule a fragmented UL bandwidth allocation for said wireless device over multiple OFDMA frames to improve frequency sub-channelization gain, wherein said fragmented UL bandwidth allocation reduces a number of frequency sub-channels carrying information for said wireless device, increases a power of said frequency sub-channels, and increases a number of frames in each packet to carry said information for said wireless device to provide an increased time diversity capacity gain.

20. The article of claim 19, wherein:
said fragmented UL bandwidth allocation is only scheduled when a maximum transmit power of said wireless device is above a predetermined threshold level.

21. The article of claim 19, wherein:
said first MCS is quadrature phase shift keying (QPSK) ½.

* * * * *